(12) United States Patent
Yanagi

(10) Patent No.: US 7,880,792 B2
(45) Date of Patent: Feb. 1, 2011

(54) IMAGE CAPTURING APPARATUS WITH THROUGH IMAGE DISPLAY FUNCTION

(75) Inventor: Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 449 days.

(21) Appl. No.: 11/644,684

(22) Filed: Dec. 21, 2006

(65) Prior Publication Data

US 2007/0146528 A1 Jun. 28, 2007

(30) Foreign Application Priority Data

Dec. 27, 2005 (JP) .............................. 2005-374109

(51) Int. Cl.
*H04N 5/222* (2006.01)
(52) U.S. Cl. ................... 348/333.01; 348/345
(58) Field of Classification Search ............. 348/208.6, 348/240.99, 240.1–2, 333.01–333.03, 333.05, 348/333.11–12
See application file for complete search history.

(56) References Cited

U.S. PATENT DOCUMENTS

| | | | |
|---|---|---|---|
| 5,172,234 A | 12/1992 | Arita et al. | |
| 7,061,528 B1 * | 6/2006 | Honma | 348/222.1 |
| 7,298,409 B1 * | 11/2007 | Misawa | 348/333.01 |
| 7,321,391 B2 | 1/2008 | Ishige | |
| 7,595,826 B2 * | 9/2009 | Aoki et al. | 348/273 |
| 2003/0160886 A1 | 8/2003 | Misawa et al. | |
| 2004/0218080 A1 * | 11/2004 | Stavely et al. | 348/333.11 |
| 2005/0046730 A1 * | 3/2005 | Li | 348/333.12 |
| 2005/0219390 A1 * | 10/2005 | Tajima et al. | 348/246 |
| 2006/0050151 A1 * | 3/2006 | Fujinawa | 348/207.99 |
| 2007/0046804 A1 | 3/2007 | Hirano et al. | |
| 2007/0140675 A1 * | 6/2007 | Yanagi | 396/88 |
| 2007/0291154 A1 * | 12/2007 | Moon et al. | 348/333.05 |

FOREIGN PATENT DOCUMENTS

| | | |
|---|---|---|
| JP | 64-68074 A | 3/1989 |
| JP | 2002-56381 A | 2/2002 |
| JP | 2002-152558 A | 5/2002 |
| JP | 2003-078801 A | 3/2003 |
| JP | 2004-200950 A | 7/2004 |
| JP | 2005-33654 A | 2/2005 |
| TW | 229549 I | 3/2005 |

OTHER PUBLICATIONS

Taiwanese Office Action dated Oct. 23, 2009 and English translation thereof issued in Taiwanese Application No. 095147395, which is a counterpart of related U.S. Appl. No. 11/638,716.
Japanese Office Action dated Jun. 22, 2010 and English translation thereof in counterpart Japanese Application No. 2005-374109.

* cited by examiner

*Primary Examiner*—Gevell Selby
(74) *Attorney, Agent, or Firm*—Holtz, Holtz, Goodman & Chick, PC

(57) ABSTRACT

A display screen of a liquid crystal display is divided into a main area and three sub-areas arranged vertically on the right thereof. A through image is displayed on the main area. On the respective sub-areas, composition images are displayed indicating different compositions and object regions different from each other. When any of the images is selected, the selection triggers the generation and recording of an image having composition similar to the selected composition image. When any of the composition images is selected, the selected composition image is enlarged and displayed on the main area.

18 Claims, 8 Drawing Sheets

IMAGE CAPTURING APPARATUS WITH THROUGH IMAGE DISPLAY FUNCTION

CROSS-REFERENCE TO RELATED APPLICATIONS

This application is based upon and claims the benefit of priority from prior Japanese Patent Application No. 2005-374109, filed Dec. 27, 2005, the entire contents of which are incorporated herein by reference.

BACKGROUND OF THE INVENTION

1. Field of the Invention

The present invention relates to an image capturing apparatus and a through image display method applicable to a digital camera equipped with a through image display function.

2. Description of the Related Art

A Digital camera is one of the image capturing apparatuses. Conventionally, the digital camera is equipped with the following display technique. That is, on standby for shooting, a plurality of images whose angles of view are respectively different are generated from a captured image by electronic zoom processing (trimming) and the generated images are multi-displayed on a monitor as through images (finder image). When any of the through images is selected, the multi-display is terminated, an optical zoom function is automatically driven in order that the selected angle of view is realized, and an image of an object is captured under the zoom condition. Thereafter, merely the captured image is full-screen displayed. When a shutter key is depressed, the image of the object is captured and the captured image is recorded (see Jpn. Pat. Appln. Publication No. 2004-200950).

With the digital camera described above, on standby for shooting before the shutter key is depressed, a user may see the result of shooting according to the difference of the zoom magnifications However, the technique described in Jpn. Pat. Appln. Publication No. 2004-200950 is not satisfactorily convenient and still has a room for improvement. With the digital camera described above, the user may see only the result of shooting according to the difference of the zoom magnifications (angles of view). Namely, the center of the object is fixed and the user may see only the difference of the display size of the main object. For example, a composition inconceivable to a user cannot be displayed.

BRIEF SUMMARY OF THE INVENTION

The object of the present invention is to provide the image capturing apparatus and the through image display method which displays a variety of composition including the composition inconceivable to the user, on standby for shooting.

According to an embodiment of the invention, an image capturing apparatus comprises:

an image capturing unit which captures an image of an object and outputs image data;

an image generating unit which generates through images indicating different compositions from the image captured by the image capturing unit; and a display control unit which controls a display unit to simultaneously display the through images generated by the image generating unit.

According to another embodiment of the invention, an image display method which is used for an image capturing apparatus comprising an image capturing unit which captures an image of an object and outputs image data, and a display unit which displays a through image of the object based on the image data output from the image capturing unit, the method comprises:

generating through images indicating different compositions from the captured image; and controlling the display unit to simultaneously display the through images.

According to still another embodiment of the invention, a computer program product configured to store program instructions for execution on a computer system which is included in an image capturing apparatus comprising an image capturing unit which captures an image of an object and outputs image data and a display unit which displays the image of the object based on the image data output from the image capturing unit, enabling the computer system to perform:

generating through images indicating different compositions from the captured image; and controlling the display unit to simultaneously display the generated through images.

DETAILED DESCRIPTION OF THE INVENTION

An embodiment of an image capturing apparatus according to the present invention will now be described with reference to the accompanying drawings.

First Embodiment

Figure 1A:
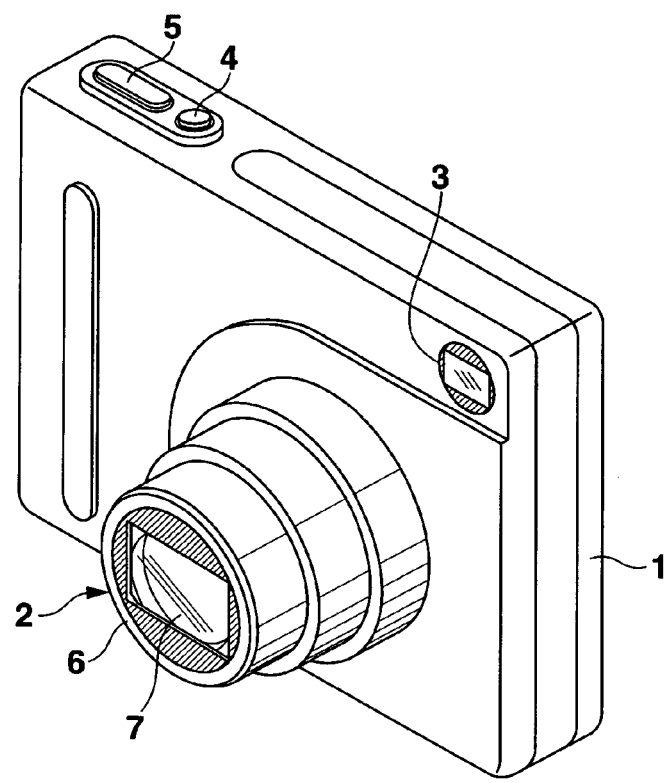
FIG. 1A is a front perspective view of a digital camera viewed from the upper side according to embodiments of the invention.
Figure 1B:
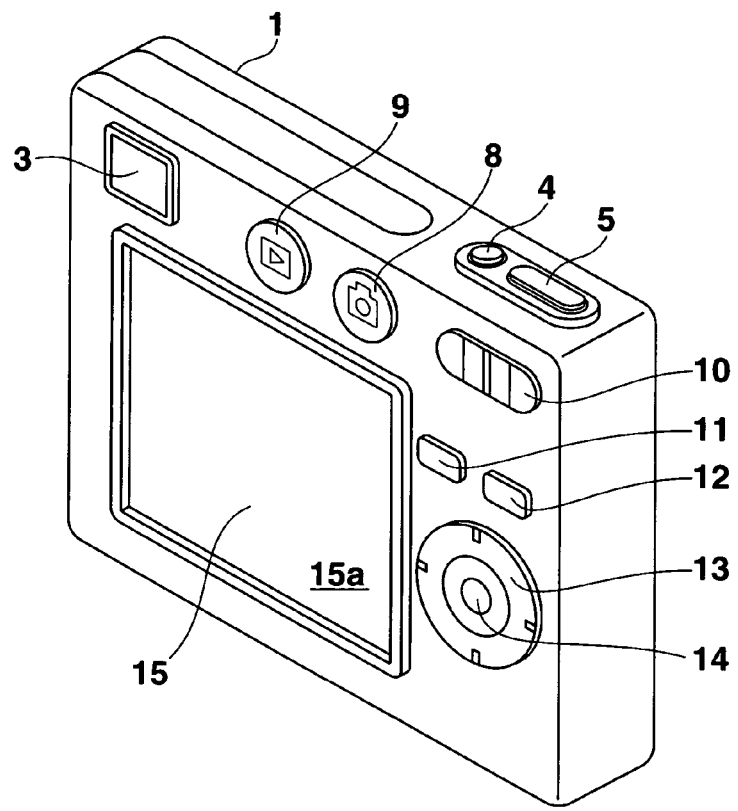
FIG. 1B is a rear perspective view of the digital camera viewed from the upper side thereof.

FIG. 1A is a front perspective view of a digital camera viewed from the upper side thereof according to embodiments of the invention. FIG. 1B is a rear perspective view of the digital camera viewed from the upper side thereof. The digital camera is equipped with a zoom function including both optical zoom and electronic zoom, an automatic exposure (AE) function and an automatic focus (AF) function. The AF function employs a contrast detection method which is commonly known. As shown in FIG. 1A, a lens unit 2 and an optical finder 3 are located on a substantially rectangular front face of a thin camera body 1. A power key 4 and a shutter key 5 are provided on a left side area of a top surface of the camera body 1.

The lens unit 2 is retractable and includes a lens barrel 6 and an image capturing lens system 7. The lens system 7 is provided in the multi-stage telescopic lens barrel 6, and is able to move along the optical axis. The lens system 7 includes optical lenses such as a zoom lens and a focus lens. The lens unit 2 protrudes forward as shown in FIG. 1A, when the power is on, or when an operation mode is changed into an image capturing mode from another mode. The lens unit 2 is housed in the camera body 1 when the power is off or when the operation mode is a playback mode.

As shown in FIG. 1B, the optical finder 3, switches, and a liquid crystal display (LCD) 15 are arranged on the rear surface of the camera body 1. The switches include a REC (recording) key 8 for setting a recording mode, a PB (playback) key 9 for setting the playback mode, a zoom key 10, a menu key 11 for displaying a menu screen, a display key 12, a ring-shaped direction key 13, a set key 14 arranged within the ring of the direction key 13.

The direction key 13 and the set key 14 are operated for selecting an item displayed on the menu screen and for image selection described later.

The LCD 15 is formed with a color LCD panel equipped with a back light. The LCD 15, on standby for shooting in the recording mode, displays an image (through image) of an object or a variety of information for shooting. An aspect ratio of a display screen 15a of the LCD 15 is 9:16, and horizontally longer than ordinary display screens having aspect ratio of 3:4. It is possible to display images on a main area A1 in maximum size, and on three sub-areas A2a, A2b, and A2c arranged vertically on the right side area of the main area A1 (see FIG. 6A). The aspect ratio of A1, A2a, A2b, and A2c is the same as the ordinary aspect ratio of 3:4.

A removable external memory 31 (see FIG. 2) such as a memory card is connected to the camera body 1 through a memory card slot provided at the bottom of the camera body 1 (not shown). The external memory 31 is a storing medium for storing the captured image.

Figure 2:
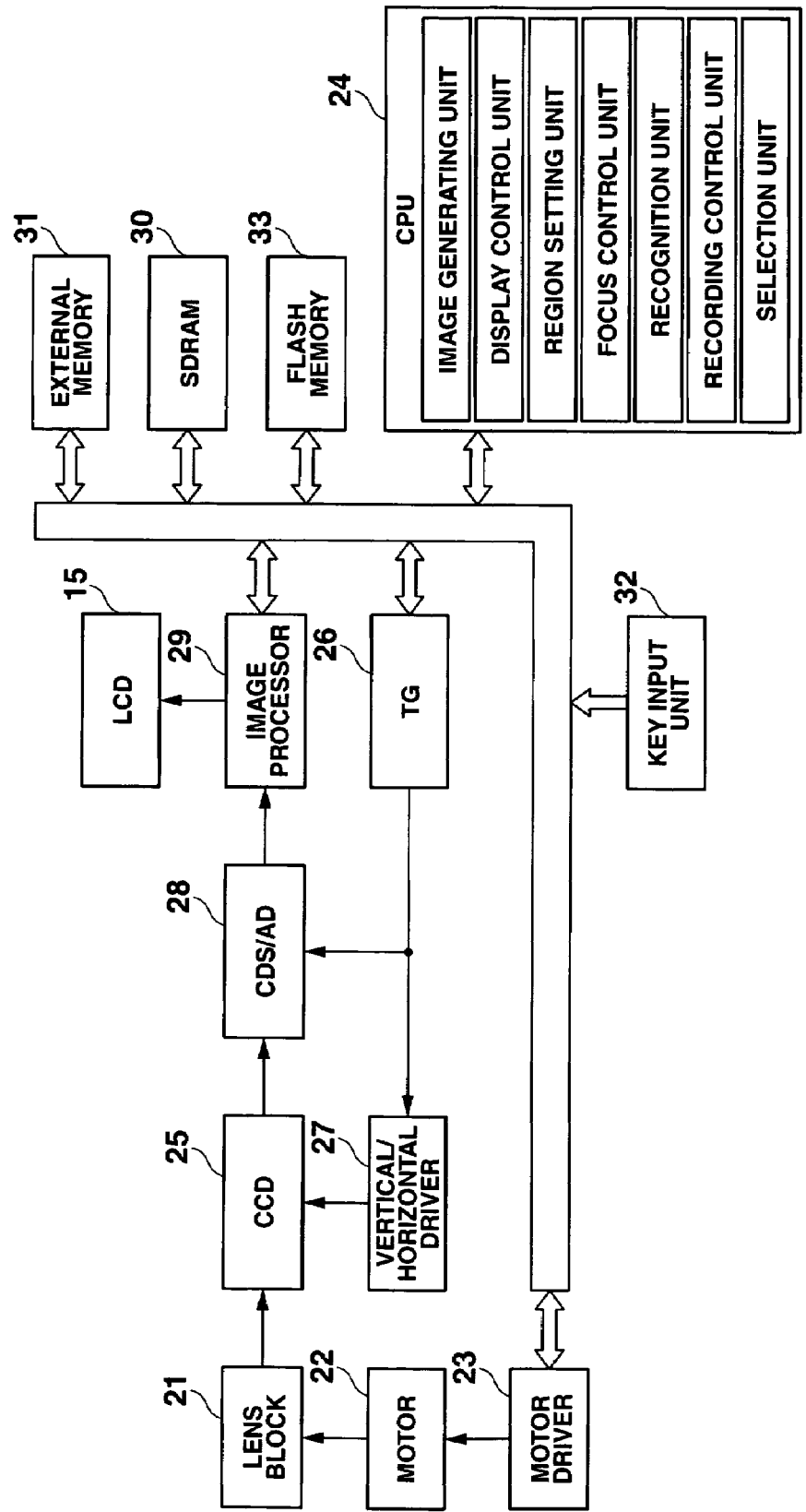
FIG. 2 is a schematic block diagram of the digital camera, showing the electric configuration thereof.

FIG. 2 is a schematic block diagram of the digital camera, showing an electric configuration thereof. A lens block 21 includes the lens barrel 6, the lens system 7 and driving mechanism. The driving mechanism drives the lens barrel 6 and the lens system 7. A motor 22 (including a zoom motor and a focus motor) is provided within the lens barrel 6, and drives the lens barrel 6 and the lens system 7 along the optical axis. A motor driver 23 drives the motor 22 according to the instruction from a CPU 24 if necessary. The CPU 24 controls the entire digital camera.

A charged coupled device (CCD) 25 is an image sensor and arranged perpendicular to the optical axis of the lens system 7 in the lens block 21. Timing generator (TG) 26 generates a timing signal according to the instruction from the CPU 24. The CCD 25 is driven by a vertical and horizontal driver 27 in response to the timing signal and outputs a captured analog image signal corresponding to a captured optical image signal of the object into a signal processing circuit (CDS/AD) 28. The signal processing circuit 28 includes a correlated double sampling (CDS) circuit which removes the noise contained in the signal output from the CCD 25 by correlated double sampling, and an analog-digital (A/D) converter which converts the captured image signal subjected to the noise removing into a digital signal. The captured image signal converted into the digital signal is output to an image processor 29.

The image processor 29 processes the input captured image signal by operations such as a pedestal clamp operation, converts the signal into a luminance signal (Y) and a color difference signal (UV), and performs digital processing such as auto white balance processing, edge enhancement processing, and pixel interpolation processing, for improving the image quality. The YUV data converted by the image processor 29 are sequentially stored in a synchronous dynamic random access memory (SDRAM) 30. In the recording mode, each time one frame of data (image data) is accumulated in the SDRAM 30, the data is converted into a video signal, and transferred to the LCD 15 to be displayed as a through image.

In a recording mode, an operation of the shutter key 5 triggers the CCD 25 to capture the image of the object. The captured image data is temporarily stored in the SDRAM 30. The CPU 24 compresses the image data temporarily stored in the SDRAM 30, and finally records the image data in the external memory 31 as a still picture file in a predetermined format. The still picture file recorded in the external memory 31 is read out by the CPU 24 for decompression in response to a selection instruction by the user in the playback mode, and is expanded and stored into the SDRAM 30 as YUV data. Thereafter the data is displayed on the LCD 15.

The key input unit 32 includes the power key 4, the shutter key 5, the REC key 8, the PB key 9 and so on. When any of the keys is operated by the user, the key input unit 32 transmits an operation signal corresponding to the content of the operation to the CPU 24.

A flash memory 33 is a non-volatile memory for storing various data and programs for causing the CPU 24 to control the components of the camera. The programs include the programs for controlling AE, AF and AWB processing. In the present embodiment, the flash memory 33 stores the programs for causing the CPU 24 to perform as an image generator, a display controller, a region setting unit, a focus controller, a recognition unit, a selection unit, and a record controller in a composition adviser mode described later. The flash memory 33 also stores setting information relating to the operation of the digital camera. The setting information is selected and determined by the user.

Figure 3:
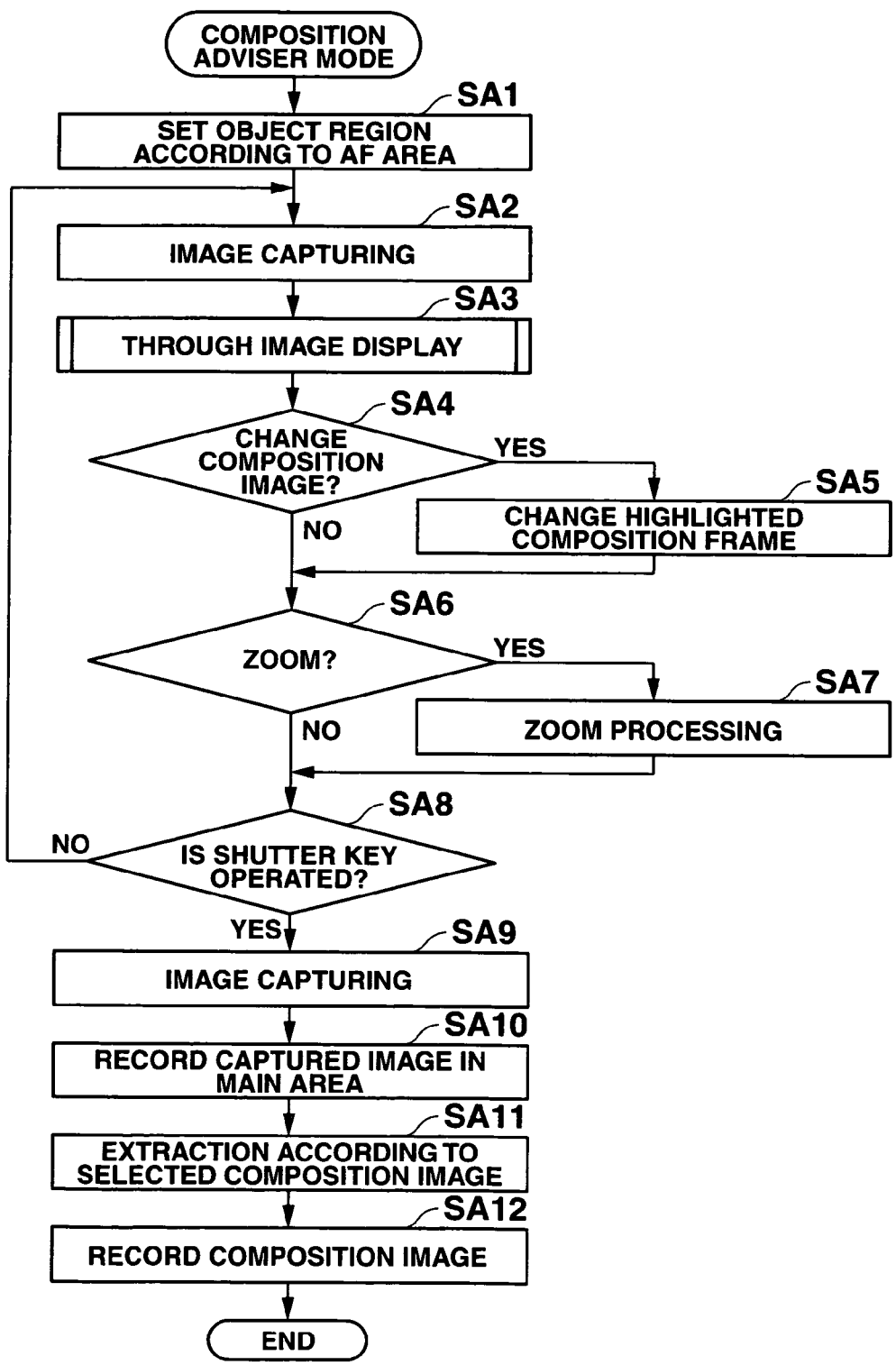
FIG. 3 is a flowchart of composition adviser mode processing of a first embodiment in the digital camera.

The operation of the digital camera having the above-described configuration will be described hereinafter. FIG. 3 is a flowchart of the composition adviser mode processing. The flowchart indicates the processing of the CPU 24 in the composition adviser mode. The operation of the power key 4 turns the power on, and the operation of the REC key 8 starts the recording (image capturing) mode. Thereafter, the configuration adviser mode processing can be selected.

In the present embodiment, when the composition adviser mode is selected through the mode switching operation (operation of the menu key 11, the direction key 13, and the set key 14) by the user, an auto-focus (AF) mode is automatically set and a size (resolution) of the captured image to be recorded is set to the maximum (highest resolution) irrespective of a setting operation by the user. Focusing is performed as follows. The user selects an AF area from among a plurality of predetermined AF areas. The selected AF area is defined as a focus detection area, and focusing is performed with respect to that area.

When the user set the composition adviser mode, the CPU 24 reads out information about object regions corresponding to the selected AF area P from the flash memory 33 (step SA1). For each AF area, corresponding object region or regions are predetermined and the flash memory 33 stores the coordinates information of the corresponding object region or regions in advance. In the case where the AF area P is located in the center of the entire image 100, four object regions are set as shown in FIGS. 5A through 5D. The object regions are respectively called the first object region 100a through the fourth object region 100d. Each object region 100a, 100b, 100c, or 100d contains the AF area P at a corner thereof as shown in FIGS. 5A to 5D. The four object regions overlap each other with respect to the AF area P. In the present embodiment, an aspect ratio of the object regions 100a through 100d is 3:4, and is identical to the aspect ratio of the entire image 100. For each AF area, the number of the corresponding object regions is predetermined. In the following description, it is assumed that the AF area P is positioned at the center of the entire image 100, and the corresponding four object regions are set as shown in FIGS. 5A through 5D.

Thereafter, the CPU 24 drives the CCD 25 and captures an image of an object (step SA2). The CPU 24 executes a through image display processing and display the captured image data on the LCD 15 as a through image (step SA3). The CCD 25 is driven at a predetermined through rate, and image capturing is performed at a predetermined time interval. The processing in steps SA2 and SA3 is repeated until the shutter key 5 is depressed. The image data periodically and sequentially captured is displayed on the LCD 15 as a through image (moving image).

Figure 4:
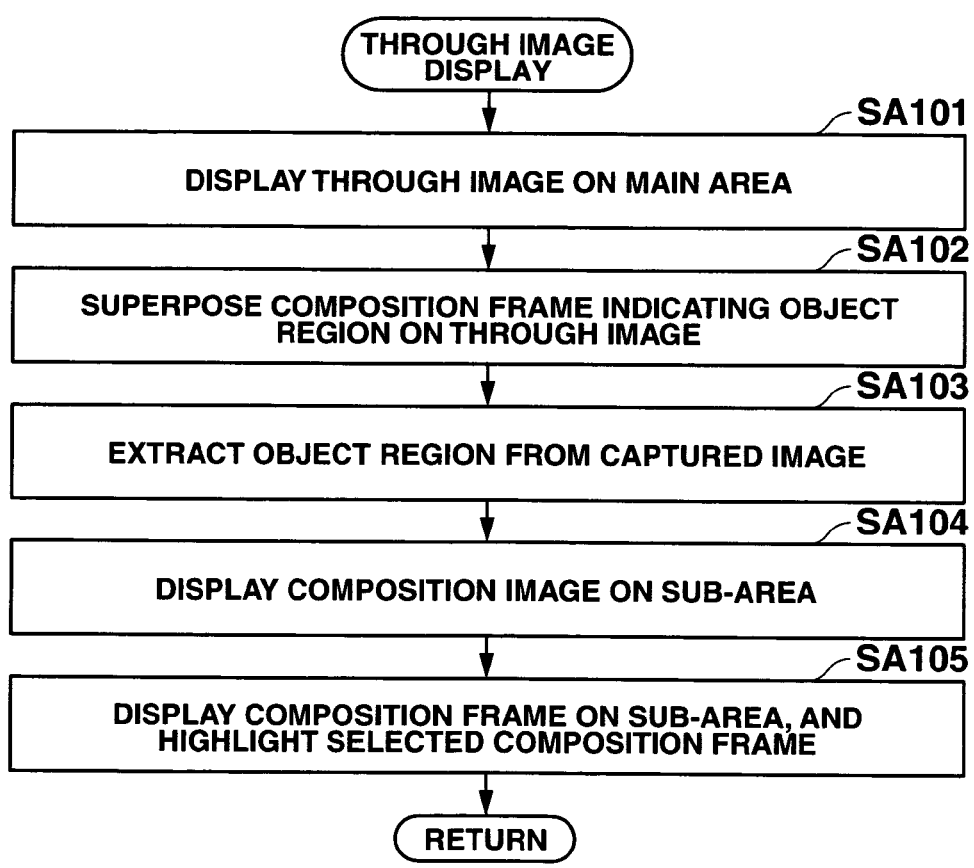
FIG. 4 is a flowchart of through image display processing in the composition adviser mode.
Figure 6A:
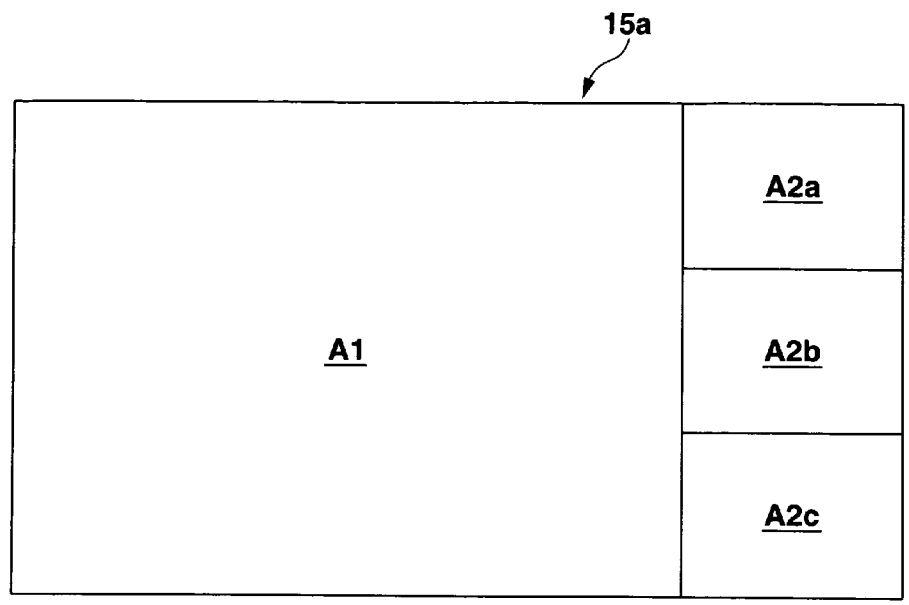
FIG. 6A is a view showing examples of display areas produced on a display screen of a liquid crystal display in the composition adviser mode.
Figure 6B:
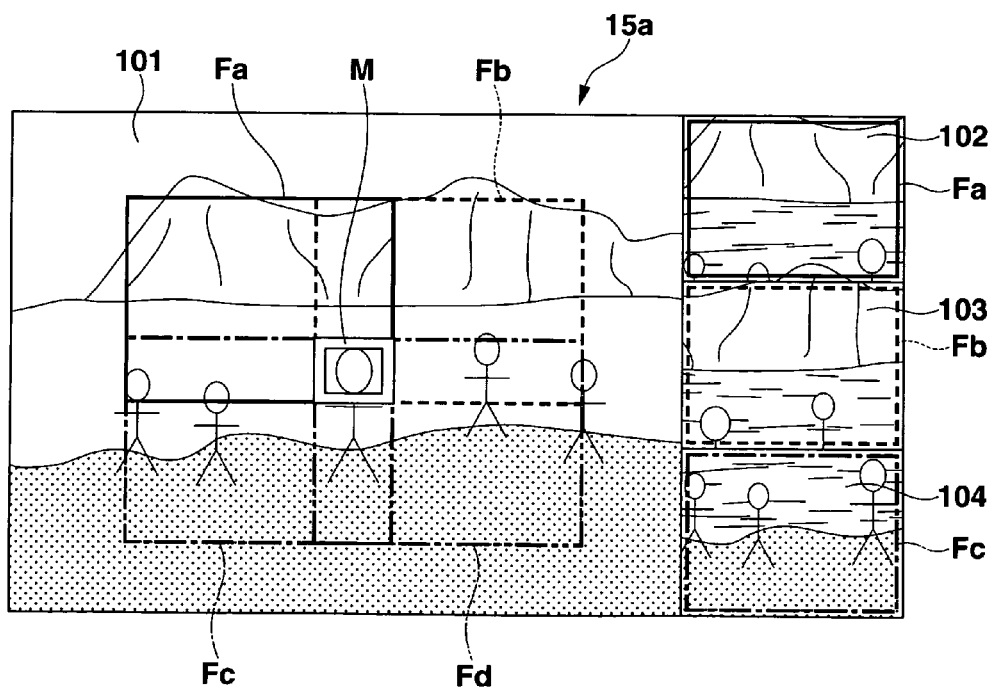
FIG. 6B is a view showing through images respectively displayed on the display areas.

FIG. 4 is a flowchart of the through image display processing in step SA3. In the processing, as shown in FIG. 6A, the display screen 15a of the LCD 15 is divided into a main area A1 and three sub-areas A2a, A2b, and A2c. As shown in FIG. 6B, a through image 101 is displayed on the main area A1 based on the image data captured in step SA2 (step SA101). When the electronic zoom is required, the captured image is subjected to the electronic zoom processing based on a setting of the zoom magnification. The image subjected to the electronic zoom processing is displayed on the main area A1 as the through image 101. Composition frames Fa to Fd are superposed on the through image 101. The four frames are displayed in different colors. The composition frames indicate the corresponding object regions (trimming regions) 100a through 100d set in step SA1 (step SA102). In FIG. 6B, different types of lines indicate the different colors. The composition frames can be distinguished from each other by the display color. A focus mark M is superposed on the through image 101 in order to indicate the AF area P.

Figure 5A:
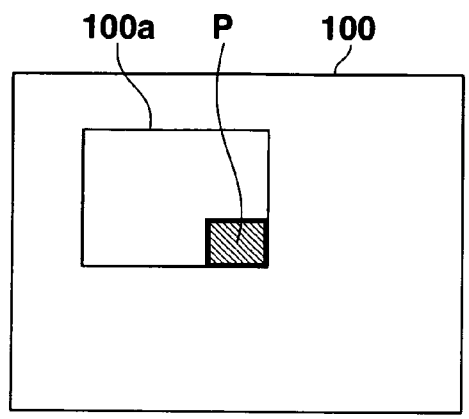
FIGS. 5A, 5B, 5C, and 5D are views showing setting of object regions corresponding to an AF area positioned in the center of an entire image.
Figure 5B:
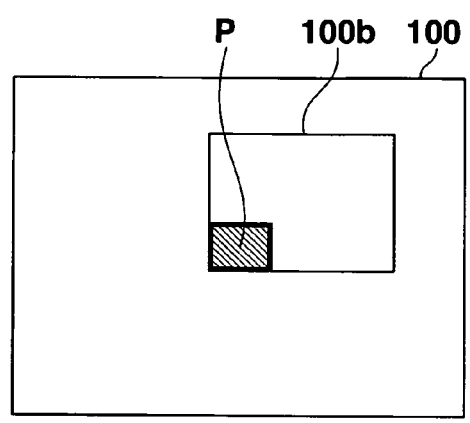
Figure 5C:
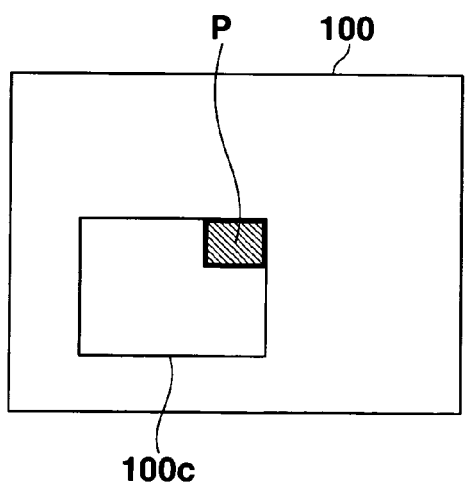
Figure 5D:
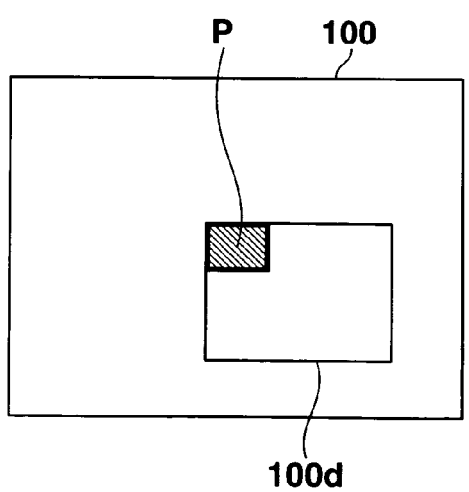

Thereafter, the object regions corresponding to the selected AF area P read out in step SA1 are extracted from the image data captured in step SA2 (when the electronic zoom processing is required, the image data subjected to the electronic zoom processing based on the setting of the electronic zoom magnification), and composition images are generated (step SA103). The number of the composition images is the same as the number of sub-areas (three in this example). In the through image display processing immediately after the composition adviser mode processing starts, three object regions, i.e., the first object region 100a through the third object region 100c shown in FIGS. 5A through 5C, are defined as the extraction regions. Partial image data corresponding to the object regions 100a, 100b, and 100c are extracted from the through image data, and the composition images 102, 103, and 104 are created. The created composition images 102, 103, and 104 (partial images displayed within the composition frames Fa through Fc on the through image 101) are displayed respectively in the first sub-area A2a through the third sub-area A2c of the display screen 15a as shown in FIG. 6B (step SA104). Namely, sub-through images 102, 103, and 104 are displayed on the sub-areas A2a, A2b, and A2c. Each of the sub-through images is a partial image of the through image 101 displayed on the main area A1, and respectively corresponds to the different object region and has different compositions. When the user sets an AF area having one or two corresponding object regions, there may be two or one sub-area in which no sub-through image is displayed. When the user set an AF area having four or more corresponding object regions, the sub-through images corresponding to the first through the third object regions are displayed on the sub-areas A2a through A2c, and the image corresponding to the remaining object region is not displayed at the time.

On the sub-areas A2a, A2b, and A2c, composition frames are displayed in the same colors as the corresponding composition frames Fa through Fc of the main area A1 (step SA105). Thereby, the relationship between the through image 101 displayed on the main area A1 and the sub-through images 102 to 104 displayed on the sub-areas A2a to A2c can be indicated. One of the sub-areas is selected in advance of starting the through image display processing. The composition frame corresponding to the predetermined (selected) sub-area (first sub-area A2a by default) is highlighted by blinking or the like. Highlighting the composition frame designates that the image within the highlighted frame is selected. Thereafter, the flow returns to the main flow shown in FIG. 3.

Subsequently, the CPU 24 determines whether or not the user operates the direction key 13 (scrolling up or scrolling down, in the present embodiment) to change the selected image (sub-area) (step SA4). The CPU 24 determines whether or not the user operates the zoom key 10 (step SA6) or the shutter key 5 (step SA8).

When it is determined that no key is operated ("NO" at steps SA4, SA6, and SA8), the flow returns to step SA2, and above-described processing is repeated.

The through image (main through image) 101 represents the composition to be captured when the operation of the shutter key 5 triggers image capturing. On standby for shooting before the shutter key 5 is operated, the user can verify the composition with the through image 101. Furthermore, the composition images indicate the composition which can be captured. The user can also see a variety of obtainable composition. The composition images 102, 103, and 104, are not created in such a manner that the centers of the extraction regions (object regions) are fixed and merely the angles of view (display size of the object) are changed. The composition images are created in such a manner that the centers of the extraction regions (object regions) are different from each other. Accordingly, the user can see the composition which is inconceivable.

On standby for shooting, when the user changes an orientation of the camera, the through image 101 displayed on the main area A1 and the composition images 102, 103, and 104 displayed on the sub-areas A2a, A2b, and A2c are changed according to the orientation change.

On standby for shooting, when it is instructed to change the composition image to be highlighted ("YES" at step SA4), the highlighted composition frame is switched in accordance with the change instruction (step SA5). Thereafter, when the flow returns to step SA3 and repeats the through image display processing if no key is operated, the newly selected composition image is highlighted in step SA105.

Although not shown in the flowchart, while the processing in steps SA2 through SA8 is being repeated, in the case where the third sub-area A2c is selected, when it is instructed to scroll down the display screen by the operation of the direction key 13, the following processing is carried out in the immediately following through image display processing.

In step SA103, a partial image corresponding to the fourth object region 100d is extracted from the captured image, and the fourth composition image is generated. In the subsequent steps SA104 and SA105, the generated fourth composition image is displayed on the first sub-area A2a. The composition frame is superposed on the fourth composition image. The display color of the superposed composition frame is the same as the composition frame Fd indicating the fourth object region on the main area A1. The remaining sub-areas A2b and A2c are blank (blacked). Namely, in the case where four or more object regions correspond to the set AF area, when it is instructed to change the selection of the composition image (sub-area), the display screen is scrolled (switched) by three composition images.

In the case where the third sub-area A2c is selected, when it is instructed to scroll down the display screen by the direction key 13, the following processing may alternatively be carried out. That is, in the above-described step SA103, three composition images are generated by extracting the three partial images corresponding to the second object region 100b through the fourth object region 100d from the captured image. The generated three composition images are displayed respectively on the first sub-area A2a through the third sub-area A2c.

On standby for shooting, when the user operates the zoom key 10 to instruct the change of the zoom magnification ("YES" at step SA6), the zoom magnification changes according to the instruction (step SA7). That is, when the change of the zoom magnification is within the optical zoom range, the zoom lens (lens system 7) is driven to the predetermined position based on the zoom magnification change. When the change of the zoom magnification is within the electronic zoom range, the size of the region to be extracted from the captured image varies according to the electronic zoom magnification change. Thereby, when the flow returns to step SA3 and repeats the through image display processing, the display size of the object on the through image 101 is different from that on the composition images 102, 103, and 104.

Then, when the CPU 24 determines that the user operated the shutter key 5 ("YES" at step SA8), the CPU 24 drives the CCD 25 to execute shooting for recording (step SA9). The image data corresponding to the through image 101 being displayed at the time of the operation of the shutter key 5, is captured and temporarily stored in the SDRAM 30. The image data, which is in the maximum size (highest resolution) and temporarily stored in the SDRAM 30, is compressed and recorded in the external memory 31 as an image file (step SA10). When the electronic zoom processing is required, the captured image data is processed by the extraction (trimming) based on the electronic zoom magnification. The image data obtained by the extraction is resized to the maximum size (highest resolution). The resized image data is temporarily stored in the SDRAM 30. The image data temporarily stored in the SDRAM 30 is compressed and recorded in the external memory 31.

Furthermore, the image data captured in step SA9 and temporarily stored in the SDRAM 30 is processed by the extraction according to the selected composition image (composition frame). Thereby, the selected image data is generated which represents the same object region as the sub-through image displayed on the selected (highlighted) sub-area (within the selected and highlighted composition frame) at the time of the operation of the shutter key 5 (step SA11). The generated image data is compressed and stored in the external memory 31 as an image file (step SA12). The image data generated in step SA11 may be resized (enlarged) to the maximum size (highest resolution) by resizing (expanding). The resized image data may be compressed and recorded in the external memory 31 as the captured image. Thereby, a single shooting operation in the composition adviser mode is completed.

In the present embodiment, the user selects a desired composition from among the composition images 102, 103, and 104 displayed on the sub-areas A2a, A2b, and A2c. The user can capture and record the desired composition by merely depressing the shutter key 5, without the execution of framing (composition adjusting). A single shooting operation allows both desired composition image and the through image 101 to be captured and recorded. The shooting is performed conveniently.

On standby for shooting before the shutter key 5 is depressed, the through image 101 and the composition images 102, 103, and 104 are displayed simultaneously. The user is able to see both the entire image to be captured and the composition serving as the reference. The user can consider and compare a variety of obtainable composition. Accordingly, the composition for shooting may easily be determined.

On the main area A1, the composition frames Fa through Fd are displayed to represent the corresponding object regions and the corresponding composition images (102, 103, 104, and the like) displayed on the sub-areas A2a, A2b, and A2c. The composition frames respectively indicate the positions of the sub-through images on the main area A1. The composition frames help the convenient determination of the composition. Each composition frame is displayed on the main area A1 in the same color as the corresponding composition frame displayed on the corresponding sub-area. The composition frames clearly indicates the relationship between the object regions (100a through 100d) provided on the through image 101 and the composition images (102, 103, 104 and the like), whereby the composition for shooting may be determined easily.

In the present embodiment, the object regions (100a through 100d) are predetermined to include the AF area (focus detection area) and to overlap each other on the entire image 100. When executing the AF control, focusing is performed in the AF area. However, the object regions may be arbitrarily set.

That is, when setting the object regions based on the AF area as in the present embodiment, the object regions need not always include the AF area. Moreover, the object regions are not always required to overlap each other.

The AF area is not limited to the area set by the user. The AF area may be automatically determined. The following AF method may be employed. The position of the focus lens is controlled to move within the focusable range, from a distal end to a proximal end (or from the proximal end to the distal end). The CCD 25 captures the images while the focus lens is being controlled to move. In each AF evaluation area predetermined on the captured image, a contrast value of the image signal is detected, and the lens position in which the contrast value is the maximum is acquired. The AF evaluation area corresponding to the most proximal lens position from among the acquired lens positions is defined as the AF area. Alternatively, the following method may be employed. That is, while the focus lens position is being controlled to move within the focusable range from the proximal end to the distal end, the contrast values of the respective AF evaluation areas are acquired. The AF evaluation area in which the peak position is first detected is defined as the AF area. In the case where the above-described AF methods are employed, the AF area is automatically determined.

However, when the AF mode is controlled to sequentially update the AF area on standby for shooting (so-called the continuous AF), it is necessary to repeat the above-described processing including step SA1. Also in the present embodiment, the processing including step SA1 may be executed repeatedly. When repeatedly executing the processing including step SA1, the user can change the AF area (i.e., the display position of the composition frames and the number of the frames) by operating the keys on standby for shooting in the composition adviser mode. When it is configured that the AF area may be automatically or manually changed on standby for shooting, the number of the corresponding object regions also changes according to the change of the AF area. Therefore, the display position and the number of the composition frames on the main area A1 (through image 101) changes. Moreover, the composition images vary and the number of the composition images changes.

On the other hand, when setting the object regions without depending on the AF area or without the AF function, the predetermined object portion such as a portion corresponding to a person (body portion) is recognized from the image captured at step SA2. The object regions are set based on the recognized portion. As the recognition method, the pattern recognition can be employed to recognize the pattern corresponding to the basic pattern which is characteristic of a person (the pattern indicating the human body or the pattern indicating the facial parts). As the predetermined object portion, an automobile, an animal, or the like may be recognized. The user may set the object type to be recognized.

For the pattern recognition, the object regions are set as follows. That is, the minimum rectangular area is acquired surrounding the recognized portion indicating the person (body portion) or the like. A plurality of object regions are set so as to include the rectangular area. When a plurality of body portions are recognized, the portions are grouped based on the relative positional relationship on the captured image. For example, the portions closely positioned are arranged into the same group. The object regions including the body portions belonging to the same group may be set for each group.

Instead of the predetermined object portions, a moving portion of the object can be recognized, for employing the image recognition method. The object regions are set to contain the recognized portion.

The recognized object portion may be set as an AF area.

The object regions may be set randomly on the entire image 100, instead of the setting based on the above-described AF area or the predetermined object portion which is the result of the image recognition.

In any of the cases described above, the number of the object regions may be one, or the user may determine the number (upper limit) of the object regions in advance by the key operation. Further, the user may determine the size (angle of view) of the object regions by the key operation in advance.

In the present embodiment, the user selects one composition image from the composition images 102, 103, and 104 displayed on the sub-areas A2a, A2b, and A2c, and the image corresponding to the selected composition is recorded together with the through image 101 in response to the shutter key 5 operation. However, only the image corresponding to the selected composition may be recorded. Moreover, there may be provided a configuration in which the user can select a plurality of composition images. The images corresponding to the selected compositions may be captured and recorded together with the image corresponding to the through image 101. Alternatively, it is possible to capture and record at once only the images corresponding to the selected compositions. That is, the direction key 13 operation cause the highlight display of the desired composition image, and the operation of the set key 14 set the selection. Thereafter, the operation of the direction key 13 and the set key 14 is repeated, and the plurality of composition images are selected and set. When the shutter key 5 is operated, the plurality of composition images are captured and recorded at once.

In the present embodiment, the selection of the composition image to be recorded is executed merely by moving the highlighted composition frame through the directional key 13 operation. However, the selection and the setting may be performed in such a manner that the operation of the direction key 13 causes the desired composition image highlighted (selected), and the set key 14 operation sets the selection. Thereby, the image to be recorded is selected and set. The image corresponding to the selected composition and the image corresponding to the through image 101 are recorded together in response to the operation of the shutter key 5. When the shutter key 5 is operated before the setting of the selection, merely the image corresponding to the through image 101 is recorded.

In the present embodiment, the through image 101 is displayed on the main area A1, and the composition images 102, 103, and 104 are displayed simultaneously on the sub-areas A2a, A2b, and A2c. However, only the through image 101 and one composition image may be displayed simultaneously. Alternatively, merely the plurality of composition images may be displayed simultaneously. When the through image 101 and merely one composition image are displayed simultaneously, the user may select either or both images for recording by the key operation. When merely the composition images are displayed simultaneously, the composition image corresponding to the image to be recorded can be selected from among the displayed composition images by the key operation.

In the present embodiment, it is described the case in which the object regions are set according to the predetermined setting condition. However, the object regions may be set according to the position, the size, or the number thereof. The position, the size, or the number of the object regions may be fixed and recorded in advance. Alternatively, the position, the size, or the number of the object regions may set manually by the user and recorded in advance.

In the present embodiment, the composition frames on the main area A1 are displayed in the same color as the corresponding composition frames displayed on the sub-areas A2a, A2b, and A2c. Therefore, the relationship between the object regions (100a through 100d) and the composition images (102, 103, 104 and the like) is explicitly indicated. Indication of the relationship between the object regions and the composition images are not limited to the above-described method. The relationship may be designated in the different way such as affixing the same number to the corresponding object region and composition image. The composition frame may not be displayed.

In the present embodiment, the object regions (composition frames) set on the through image 101 are generated in the same size (same electronic zoom magnification). However, the size (angle of view) may be varied.

In the present embodiment, the object regions are set on the through image 101 in such a manner that the centers (cross points of the diagonals) of the object regions (composition frames) become different from each other. The object regions may include the regions having the same center and different size from each other.

In the present embodiment, the aspect ratio of the object regions (composition frames) set on the through image 101 are the same to each other. However, the aspect ratio may be different for each object regions.

Other embodiments of the image capturing apparatus according to the present invention will be described. The same portions as those of the first embodiment will be indicated in the same reference numerals and their detailed description will be omitted.

Second Embodiment

Figure 7:
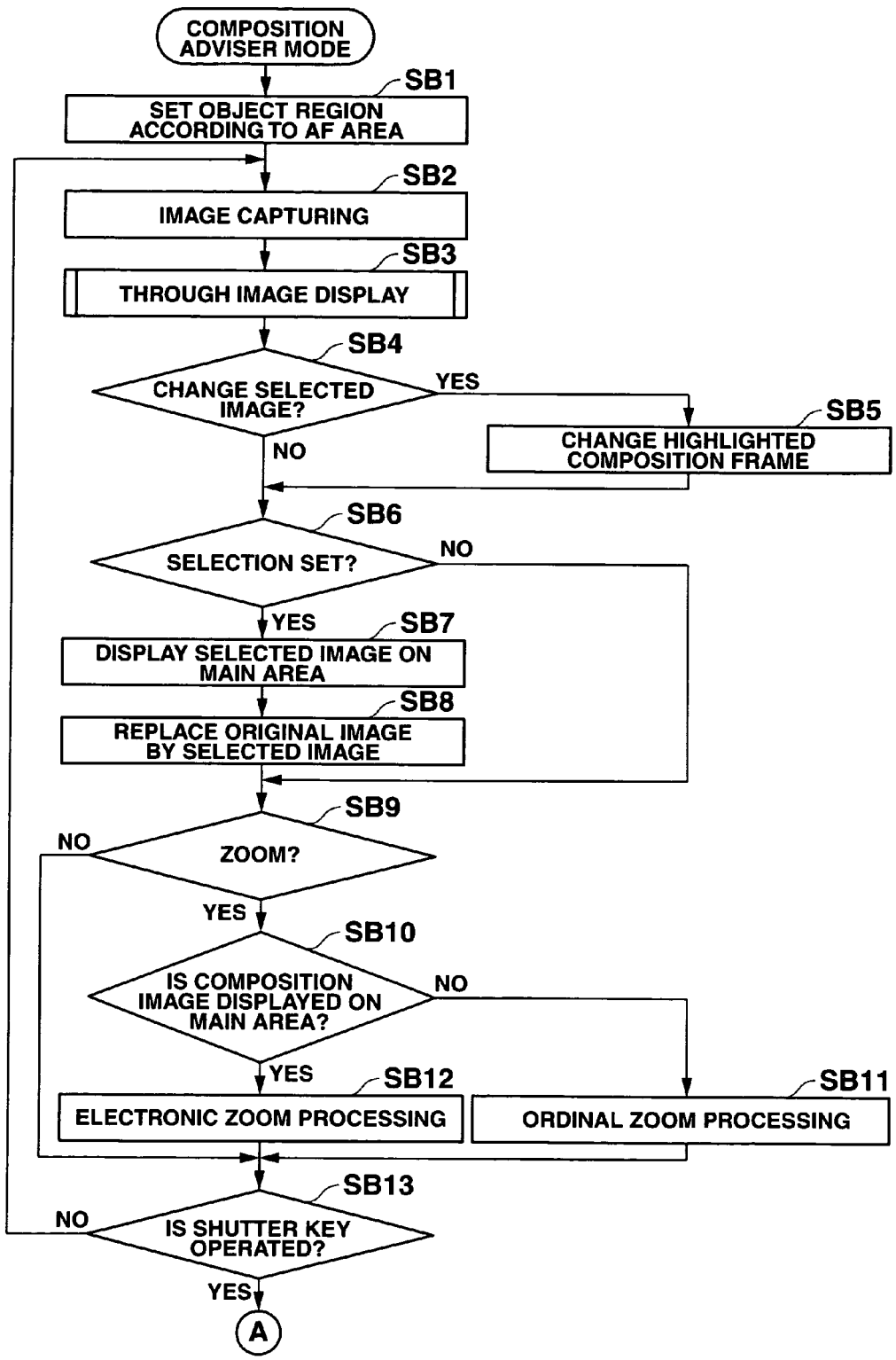
FIG. 7 is a flowchart of composition adviser mode processing of a second embodiment.

The second embodiment of the present invention will be described hereinafter. FIG. 7 is a flowchart of the composition adviser mode processing in the present embodiment executed by the CPU 24 of the digital camera having the configuration shown in FIGS. 1A, 1B and 2. The operation of the power key 4 turns the power on, and the operation of the REC key 8 starts the recording (image capturing) mode. Thereafter, the composition adviser mode processing can be selected.

When the composition adviser mode is selected, the CPU 24 sets the object region according to the predetermined AF area (step SB1). The AF area is set in advance. The CPU 24 drives the CCD 25 to execute image capturing (step SB2). The through image display processing shown in FIG. 4 is executed and the LCD 15 displays the captured image data as a through image (step SB3). The processing of steps SB2 and SB3 is repeatedly executed. Thereby, the CCD 25 is driven at a predetermined through rate, and image capturing is carried out at a predetermined time interval. The image data captured periodically and sequentially are displayed as the through image (moving image) on the LCD 15.

The through image display processing is the same as the processing shown in FIG. 4 in the first embodiment. In the through image display processing, the display screen 15a of the LCD 15 is divided into the main area A1 and three sub-areas A2a, A2b, and A2c, as shown in FIG. 6A. As shown in FIG. 6B, the through image 101 and composition frames Fa to Fd are displayed on the main area A1. The composition frames respectively indicate the four object regions 100a through 100d set in step SB1. Composition images 102, 103, and 104 (partial through images within the composition frames Fa to Fc) are respectively displayed on the first sub-area A2a through the third sub-area A2c. On the composition images, the composition frames Fa through Fc are displayed in the same colors as the corresponding composition frames on the main area A1. One of the sub-areas is selected in advance of the start of the through image display processing. The composition frame corresponding to the selected sub-area is emphasized by blinking or the like.

Thereafter, it is determined whether or not the user operates the direction key 13 (scrolling up or scrolling down, in the present embodiment) to change the selected image (sub-area) (step SB4). When it is instructed to change the selected image ("YES" at step SB4), a composition frame to be highlighted is changed (step SB5). The processing of steps SB1 through SB5 is same as the first embodiment.

Subsequently, the CPU 24 determines whether or not the user performs the selection of the composition image by the set key 14 (step SB6). When the set key 14 is not operated ("NO" at step SB6), the flow goes to step SB9 and it is determined whether or not the zoom key 10 is operated to execute the zoom processing. On the other hand, when it is determined that the set key 14 is operated ("YES" at step SB6), the selected composition image (partial through image according to the selected object region) is displayed on the main area A1 of the display screen 15a (step SB7). Namely, the selected composition image is enlarged and displayed on the main area A1. Accordingly, the user may easily check the selected composition (through image). Once the composition image is selected and enlarged to be displayed in the main area A1 at step SB7, the enlarged composition image displayed in the main area A1 is regarded as the through image at step SB3 which follows step SB13.

The original image, from which the composition images are generated, is replaced by the image which is determined in step SB6 and enlarged to be displayed on the main area A1 (step SB8). The composition images, which are displayed on the sub-areas before the selection of the composition image, are also replaced by the partial images of the composition image selected by the user. The object region corresponding to the selected composition image is extracted and the partial image is generated. The generated image is enlarged and displayed on the main area A1, instead of the entire image of the object. The object regions 100a to 100d are newly set on the image displayed on the main area A1. The relative positional relationship and the size of the newly set object regions are the same as the case of the setting on the entire image of the object. The new composition images (sub-through images) are created by the extraction based on the set object regions (extraction regions). The created composition images are displayed respectively on the sub-areas A2a through A2c.

Subsequently, the CPU 24 determines whether or not the zoom key 10 is operated to instruct the zoom processing (step SB9). The CPU 24 also determines whether or not the shutter key 5 is operated (step SB13). When any of the keys is not operated ("NO" at steps SB9 and SB13), the flow reverts to step SB2 and above-described processing is repeated.

On standby for shooting before the shutter key 5 is operated, in the case where any of the composition image is not selected, the through image 101 (main through image) represents the composition to be captured when the shutter key 5 operation triggers the image capturing. The user can verify the composition to be captured. Furthermore, the user may see a variety of obtainable composition through the composition images (sub-through images) displayed on the sub-areas A2a, A2b, and A2c. The composition images 102, 103, and 104, are not created in such a manner that merely the centers of the extraction regions (object regions) are fixed and the angles of view (display size of the object) are changed. The composition images are created in such a manner that the centers of the extraction regions (object regions) are different from each other. Accordingly, the user can see the composition which is inconceivable.

When the desired composition image is selected, the selected composition image is displayed on the main area A1 which is larger than the sub-areas A2a, A2b, and A2c. The user may easily verify the desired composition with the image displayed on the main area A1. The user may also see the variety of obtainable composition through the composition images (sub-through images) newly displayed on the sub-areas A2a, A2b, and A2c.

In the case where the processing of steps SB2 through SB13 is being repeated, when the user instructs to change the zoom magnification by operating the zoom key 10 ("YES" at step SB9), the following zoom processing is executed. When the above-described selection and setting operation of the composition image is not performed in advance of the zoom magnification change instruction ("NO" at step SB10), the ordinary zoom processing is executed according to the change of the zoom magnification (step SB11). In the case where the change of the zoom magnification is within the optical zoom range, the zoom lens (lens unit 7) is driven to the predetermined position according to the zoom magnification change. In the case where the change of the zoom magnification is within the electronic zoom range, the size of the extraction region on the captured image is changed according to the electronic zoom magnification.

When it is determined that the shutter key 5 is not operated ("NO" at step SB13), the flow returns to step SB2. The image capturing processing and the through image display processing are repeatedly executed according to the zoom magnification change.

Figure 8:
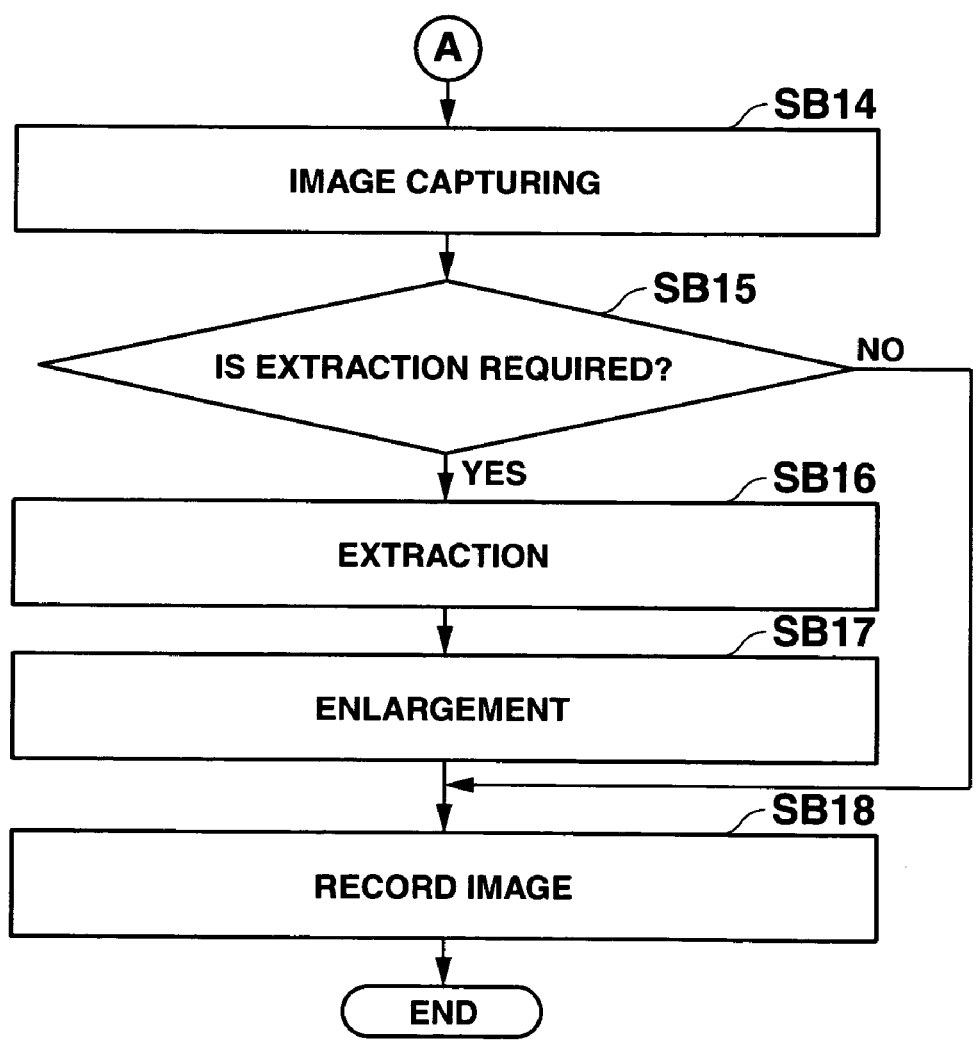
FIG. 8 is a flowchart which follows FIG. 7.

While the processing of steps SB2 through SB13 is being repeated, when the user depressed the shutter key 5 ("YES" at step SB13), the CPU causes the CCD 25 to capture the image for recording and the captured image is temporarily stored in the SDRAM 30 (step SB14), as shown in FIG. 8. Subsequently, the CPU 24 determines whether or not the electronic zoom processing (image extraction) is required (step SB15). It is determined that the electronic zoom processing is required, in the case where the zoom magnification, which corresponds to the through image being displayed on the main area A1 when the shutter key 5 is depressed, is within the electronic zoom range, and/or in the case where the selection and setting operation of the composition image is carried out by the set key 14 operation before the shutter key 5 is depressed.

When it is determined that the electronic zoom processing is required ("YES" at step SB15), from the image data temporarily stored in the SDRAM 30 (entire image), the object region being displayed on the main area A1 at the time of the depression of the shutter key 5 is extracted, and the remaining portion is eliminated (step SB16). The image data subjected to the electronic zoom processing is enlarged to the image size for recording (step SB17). The enlarged image data is compressed and stored in the external memory 31 (step SB18).

It is determined that the electronic zoom processing is not required, in the case where the determination result of step SB15 is "NO" and the zoom processing is not required, i.e., in the case where the zoom magnification, which corresponds to the through image being displayed on the main area A1 when the shutter key 5 is depressed, is within the optical zoom range, and in the case where the selection and the setting operation of the composition image is not performed in advance of the shutter key 5 depression. When the electronic zoom is not required, the image data temporarily stored in the SDRAM 30 is immediately compressed as is and recorded in the external memory 31 (step SB18).

Namely, regardless whether or not the electronic zoom processing is required, when the shutter key 5 is depressed ("YES" at step SB13), the image having the same composition as the through image being displayed on the main area A1 at the time of the operation of the shutter key 5 is captured and recorded. Thereby, a single shooting operation in the composition adviser mode is completed.

Also in the present embodiment, when capturing the image with the composition adviser mode, the user is merely required to select a desired composition from among the composition images and to depress the shutter key 5. The image having the desired composition may be immediately recorded.

However, it is different from the first embodiment that only the image corresponding to the composition of the through image displayed on the main area A1 is captured and recorded. When the desired composition image is selected and set on standby for shooting, the selected image is displayed as a through image on the main area A1. The main area A1 on which the selected composition image is displayed is larger than the sub-areas A2a through A2c. Therefore, the user can easily check the selected composition. The composition images 102, 103, and 104 are newly generated according to the selected image, and newly displayed on the sub-areas. By referring to the newly displayed composition images, the user may also see a variety of obtainable composition. After the composition image selected by the user is enlarged and displayed on the main area A1 as the through image, it is possible to change the zoom magnification of the through image by the operation of the zoom key 10. Thereby, the user can finely adjust the selected image to produce a more optimal image. Further, the similar advantages to the first embodiment are realized in the present embodiment.

In the present embodiment, on standby for shooting, it is configured that the operation of the direction key 13 and the set key 14 for executing the selection and the setting of the composition image can be performed by unlimited number of times. However, every time the selection and setting operation is performed, the object region obtained by the electronic zoom processing of step SB16 becomes smaller, and the magnification of the enlargement of the image data in step SB16 increases. Thus, the image quality is degraded if the selection and setting of the composition image are performed by unlimited number of times. Moreover, the display of the image changes substantially when the camera orientation is changed. Therefore, the number of times to select and set the composition images may be limited to the predetermined number (e.g., once or twice), in order to maintain the image quality of the captured image within the predetermined range. Furthermore, the electronic zoom processing (step SB12), which is executed while the image selected by the user is being displayed on the main area A1, may be limited by setting the upper limit to the zoom magnification change.

Further, in the present embodiment, the object regions (100a through 100d) are arranged on the entire image 100 to respectively include the AF areas (focus detection areas), on which the focusing is performed for the AF control, and to be overlapped each other. Moreover, it is assumed that the AF area is preset by the user, in the above description. However, the AF area and the object regions may be arbitrarily set on the entire image 100.

The composition frames on the main area and the corresponding composition frames on the sub-areas are displayed in the same color. Thereby, the relationship between the object regions (100a through 100d) displayed on the through image 101 and the composition images (102, 103, 104 and the like) are clearly indicated. The way to indicate the relationship is not limited to the display color of the composition frames. The relationship may be designated in the different way such as displaying the same number to the corresponding composition frames.

In the first and second embodiments, the display screen 15a is divided into the main area A1 and the smaller sub-areas A2a, A2b, and A2c. The through image 101 is displayed on the main area A1 and the composition images (sub-through images) 102, 103, and 104 are displayed respectively on the sub-areas A2a, A2b, and A2c. However, the sizes of all the areas may be made equal. Regardless of the size of the areas, the number of the composition images (number of the sub-areas) to be simultaneously displayed can be changed. Moreover, it may be configured that merely the composition images are displayed simultaneously, without generating the main area A1.

In the above-described embodiments, the aspect ratio of the display screen 15a is 9:16, and horizontally longer than ordinary aspect ratio of 3:4. However, the aspect ratio of the display screen 15a is not limited to the horizontally longer aspect ratio. The display screen having ordinary aspect ratio may be applied to the present invention.

In the above-described embodiments, the present invention is applied to the digital camera. However the application of the present invention is not limited to the digital camera. The present invention is easily applied to a camera-equipped mobile phone, a camera-equipped personal digital assistants (PDA), a personal computer having a camera function, or the like.

What is claimed is:

1. An image capturing apparatus comprising:
an image capturing unit which captures an image of an object and outputs image data;
an image generating unit which generates through images indicating different compositions based on the image data output from the image capturing unit, wherein the through images indicating different compositions have respective centers at different coordinates of the image data;
a display control unit which controls a display unit to simultaneously display a through image of the image data output from the image capturing unit and the through images indicating different compositions generated by the image generating unit; and
a focus control unit which controls a focus automatically;
wherein the image generating unit includes a region setting unit which sets at least one region on the image captured by the image capturing unit in accordance with a focus area focused by the focus control unit.

2. The image capturing apparatus according to claim 1, wherein the image generating unit generates the through images indicating different compositions by extracting a plurality of different areas from the image captured by the image capturing unit.

3. The image capturing apparatus according to claim 1, wherein the image generating unit generates the through images to indicate different compositions and to have different zoom magnifications, from the image captured by the image capturing unit.

4. The image capturing apparatus according to claim 1, wherein the through images indicating different compositions include at least one through image corresponding to the at least one region set by the region setting unit.

5. The image capturing apparatus according to claim 1, wherein the region setting unit sets a plurality of regions on the image captured by the image capturing unit, and the image generating unit generates the through images indicating different compositions to correspond to the regions set by the region setting unit.

6. The image capturing apparatus according to claim 1, further comprising a selection unit which manually selects any of the through images indicating different compositions displayed on the display unit.

7. The image capturing apparatus according to claim 6, wherein the display control unit controls the display unit to display the image selected by the selection unit in such a way that a display size of the selected image is larger than a display size of the image before the selection by the selection unit.

8. An image capturing apparatus comprising:
an image capturing unit which captures an image of an object and outputs image data;
an image generating unit which includes a region setting unit which sets a plurality of regions on the image data output from the image capturing unit, wherein the image generating unit generates first through images indicating different compositions to correspond to the plurality of regions set by the region setting unit and a second through image of the image data which is output from the image capturing unit and on which the plurality of regions are set; and
a display control unit which (i) divides a display screen of a display device into a first area and a plurality of second areas, the display screen having an aspect ratio which is different from an aspect ratio of the image data output from the image capturing unit, and the first area and the plurality of second areas having aspect ratios which are the same as the aspect ratio of the image data, and (ii) displays the second through image on the first area and displays the first through images on the second areas.

9. The image capturing apparatus according to claim 8, wherein the display control unit displays a composition frame superposing on the through image displayed on the first area in order to indicate corresponding images displayed on the second areas.

10. The image capturing apparatus according to claim 9, wherein the display control unit controls the display unit to display a plurality of composition frames on the first area in a form by which a relationship with the images displayed on the second areas is explicitly represented.

11. The image capturing apparatus according to claim 8, further comprising:
a selection unit which manually selects any of the images displayed on the second areas,
wherein the display control unit displays the image selected by the selection unit on the first area.

12. The image capturing apparatus according to claim 11, further comprising:
a recording instruction unit which instructs recording; and
a recording control unit which records in a recording medium image data corresponding to a composition indicated by the through image displayed on the first area in response to a recording instruction from the recording instruction unit.

13. The image capturing apparatus according to claim 6, further comprising:
a recording instruction unit which instructs recording; and
a recording control unit which records in a recording medium image data corresponding to a composition indicated by the image selected by the selection unit in response to a recording instruction from the recording instruction unit.

14. The image capturing apparatus according to claim 13, wherein the region setting unit sets a plurality of regions on the image captured by the image capturing unit,
wherein the image generating unit generates the through images indicating different compositions to correspond to the regions set by the region setting unit, and
wherein the recording control unit records in the recording medium the image data output from the image capturing unit and the image data corresponding to the composition indicated by the image selected by the selection unit, in response to the recording instruction from the recording instruction unit.

15. An image display method which is used for an image capturing apparatus comprising an image capturing unit which captures an image of an object and outputs image data, a display unit, and a focus control unit which controls a focus automatically, the method comprising:
setting at least one region on the image captured by the image capturing unit in accordance with a focus area focused by the focus control unit;
generating through images indicating different compositions based on the image data output from the image capturing unit, wherein the through images indicating different compositions have respective centers at different coordinates of the image data; and controlling the display unit to simultaneously display a through image of the image data output from the image capturing unit and the through images indicating different compositions.

16. A computer readable medium having encoded thereon a computer program executable by a computer system of an image capturing apparatus comprising an image capturing unit which captures an image of an object and outputs image data, a display unit, and a focus control unit which controls a focus automatically, the computer program being executable by the computer system to perform a method comprising:
  setting at least one region on the image captured by the image capturing unit in accordance with a focus area focused by the focus control unit;
  generating through images indicating different compositions based on the image data output from the image capturing unit, wherein the through images indicating different compositions have respective centers at different coordinates of the image data; and
  controlling the display unit to simultaneously display a through image of the image data output from the image capturing unit and the generated through images indicating different compositions.

17. An image display method which is used for an image capturing apparatus comprising an image capturing unit which captures an image of an object and outputs image data, and a display device, the method comprising:
  setting a plurality of regions on the image data output from the image capturing unit;
  generating first through images indicating different compositions to correspond to the set plurality of regions and a second through image of the image data which is output from the image capturing unit and on which the plurality of regions are set; and
  dividing a display screen of the display device into a first area and a plurality of second areas, the display screen having an aspect ratio which is different from an aspect ratio of the image data output from the image capturing unit, and the first area and the plurality of second areas having aspect ratios which are the same as the aspect ratio of the image data, displaying the second through image on the first area, and displaying the first through images on the second areas.

18. A computer readable medium having encoded thereon a computer program executable by a computer system of an image capturing apparatus comprising an image capturing unit which captures an image of an object and outputs image data, and a display device, the computer program being executable by the computer system to perform a method comprising:
  setting a plurality of regions on the image data output from the image capturing unit;
  generating first through images indicating different compositions to correspond to the set plurality of regions and a second through image of the image data which is output from the image capturing unit and on which the plurality of regions are set; and
  dividing a display screen of the display device into a first area and a plurality of second areas, the display screen having an aspect ratio which is different from an aspect ratio of the image data output from the image capturing unit, and the first area and the plurality of second areas having aspect ratios which are the same as the aspect ratio of the image data, displaying the second through image on the first area, and displaying the first through images on the second areas.

* * * * *